July 7, 1931. H. M. SHEPPARD 1,813,126
VALVE
Filed Oct. 4, 1926 2 Sheets-Sheet 1
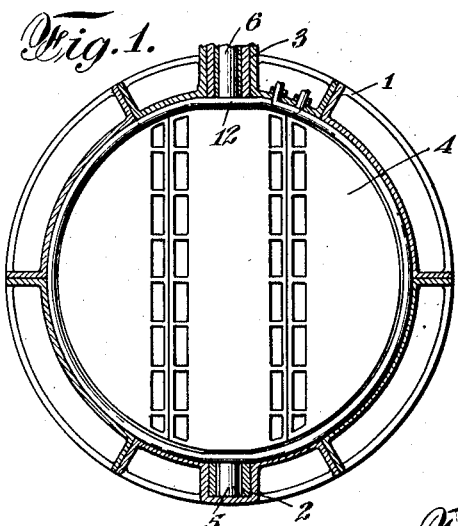
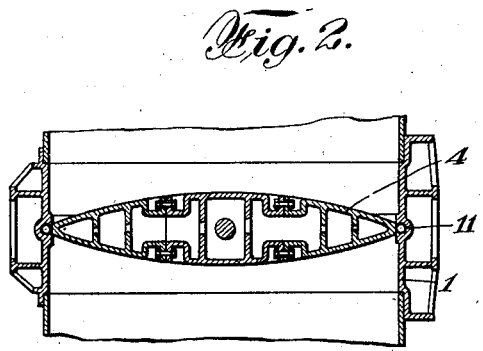
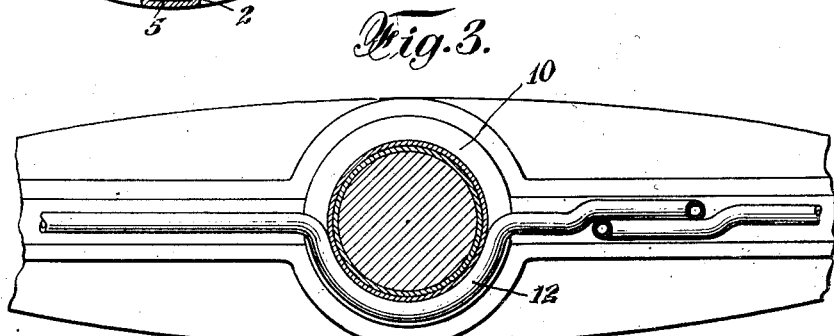
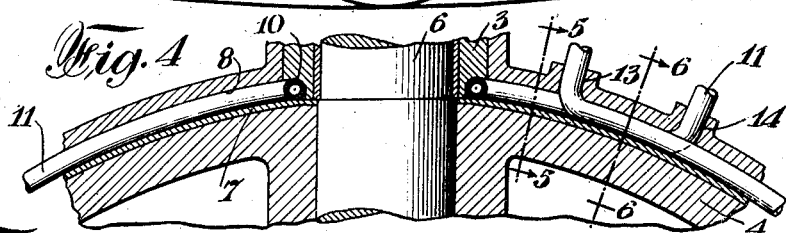
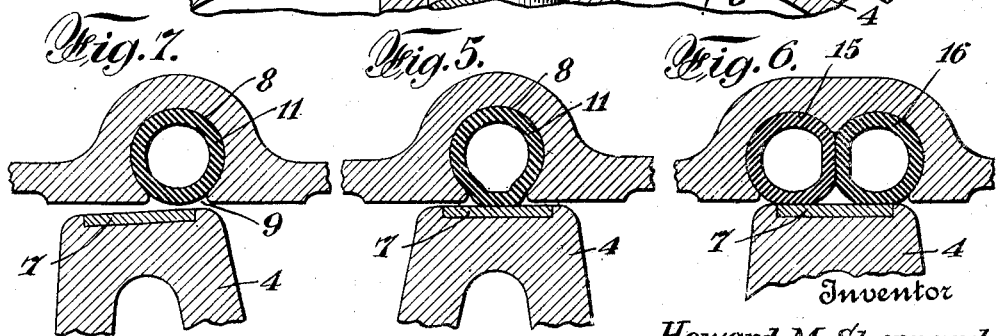
Inventor
Howard M. Sheppard
By his Attorneys
Edwards, Sager & Bowei.

July 7, 1931.  H. M. SHEPPARD  1,813,126
VALVE
Filed Oct. 4, 1926    2 Sheets-Sheet 2
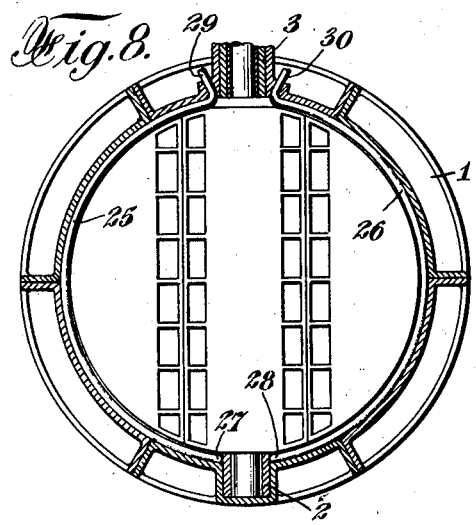
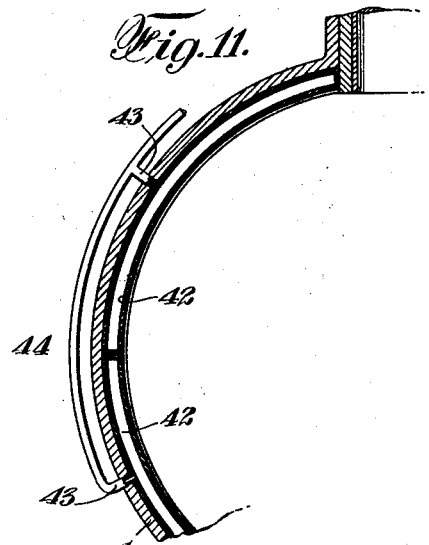
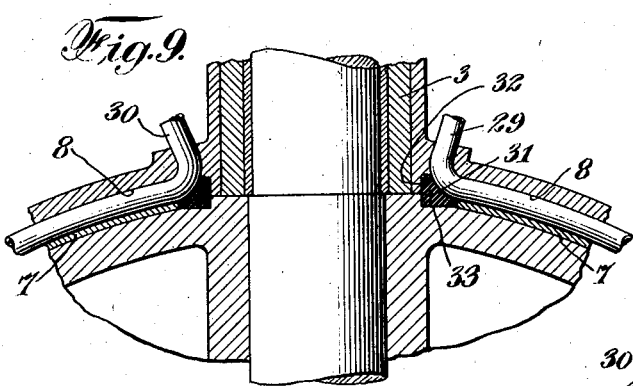
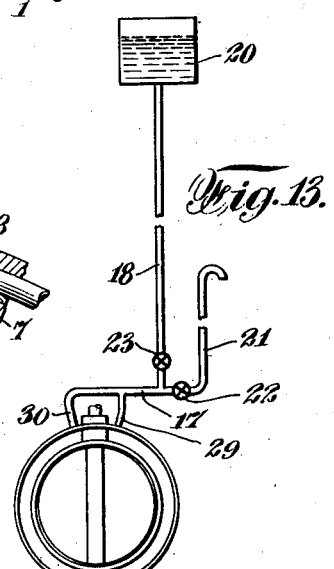
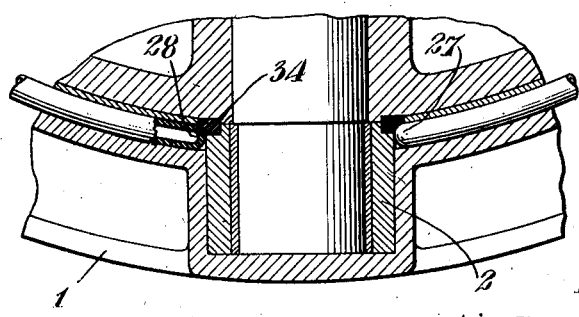
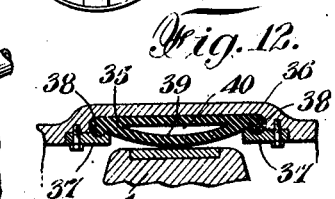
Inventor
Howard M. Sheppar
By his Attorneys
Edwards, Sager & Bower Patented July 7, 1931

1,813,126

UNITED STATES PATENT OFFICE

HOWARD M. SHEPPARD, OF PHILADELPHIA, PENNSYLVANIA, ASSIGNOR TO I. P. MORRIS CORPORATION, A CORPORATION OF DELAWARE

VALVE

Application filed October 4, 1926. Serial No. 139,414.

My invention relates to valves, and more particularly to sealing means therefor.

An object of my invention is to provide pressure-controlled expansible tubular sealing means between the movable valve member and its casing.

A further object is to so control the pressure within the tubular means that it is expanded to effect sealing action and allowed to contract when the valve member is being moved, thereby to give clearance between the valve and tubular sealing means.

Another object is to prevent collapse of the tubular means when sealing action is not present.

A more specific object is to provide an improved arrangement for supporting the tubular means with respect to the casing and movable valve element, and to provide suitable means whereby pressure can be conducted to the sealing means.

A further specific object is to provide such a sealing means between the periphery of a pivot valve and its casing, the tubular means being preferably carried by the casing.

Further objects will be apparent from the following description of the accompanying drawings, in which:—

Fig. 1 is a transverse section through a pivot valve, showing the pivotal valve member in elevation;

Fig. 2 is a section on line 2—2 of Fig. 1;

Fig. 3 is an enlarged section taken on line 3—3 of Fig. 1;

Fig. 4 is an enlarged fragmentary vertical section of the valve mechanism adjacent the top bearing for the pivot valve member;

Figs. 5 and 6 are transverse sections taken on their respective lines in Fig. 4;

Fig. 7 is a view similar to Fig. 5, but showing the tube contracted, the pivot valve member being moved;

Fig. 8 is a transverse section through a pivot valve showing a modified form of arrangement of the tubular sealing means;

Fig. 9 is an enlarged fragmentary sectional view of the pivot valve and casing adjacent the top bearing;

Fig. 10 is a similar view adjacent the lower bearing;

Fig. 11 is a modified form of arrangement of the tube;

Fig. 12 is a cross section of modified form of the tube;

Fig. 13 is a diagrammatic view showing fluid means for creating the expanding pressure and preventing collapse of the tubular sealing means.

In the illustrated embodiment of my invention, I have shown a usual type of pivot valve having a casing 1 made up of a plurality of sections, the lower and upper ones of which have bearings 2 and 3 respectively. The casing 1 as usual will be interposed between up and down stream pipes of a pipe line, while flow therethrough will be controlled by a pivotal or disc valve member 4 having usual pivot shafts 5 and 6 journaled in the bearings 2 and 3. The periphery of the disc 4 may be provided with any suitable material 7, such as bronze, rubber or the like, it being noted that in valve mechanisms suitable for controlling flow through conduits or pipe lines, of which the pivot valve is one specific form, the surfaces of the valve element and its casing, which cooperate to shut off flow when the valve is in closed position, have substantially parallel relative movement, which is in distinction to those types of valves where the valve element moves to its seat or closing position in a direction substantially at right angles thereto.

To seal the disc and casing, the latter is provided, as shown in Fig. 5, with a groove 8, whose transverse section is cylindrical, and which extends around the inner periphery of the casing 1. The groove is positioned so that its radius of cross-sectional curvature will approximately intersect the casing periphery, thereby forming an opening 9, which likewise extends completely around the periphery, except adjacent the bearings 2 and 3. In this case, as shown in Fig. 4, the inner ends of the bearings are provided with an annular groove 10, adapted to match the grooves 8.

The sealing means constitutes preferably a heavy rubber tube 11 disposed within the peripheral grooves 8 and extending also within the annular grooves 10, thereby to form an arcuate sealing portion 12 around the bearings 2 and 3. The tube preferably just snugly fits the receiving grooves when in its contracted unsealing condition, thereby preventing accumulation of foreign material, such as sand, silt or the like between the tube and the surfaces of the groove. The tube is led into and out of the groove through openings 13 and 14, these being spaced apart not only circumferentially, but also in a direction transverse to the axis of the tubes, thereby permitting, as shown in Figs. 3 and 4, the two ends 15 and 16 of the tube to overlap. This permits a complete sealing action to be had around the periphery of the valve, and at the same time allows ample room for gradually turning the relatively heavy tube outwardly. The groove 8 adjacent the overlapping portions 15 and 16 is widened accordingly, and at this point both tubes, as shown in Fig. 6, will engage the periphery of the disc member.

In operation, the disk is first rotated into closed position with the tube partially deflated to avoid contact with the disk periphery thereby presenting a clearance space when the valve is unsealed. When disk 4 is in closed position, pressure is admitted to the tube, to cause outward movement or protrusion of a portion of the tube through opening 9, shown in Fig. 5, into contact with the disk periphery thereby effecting a seal between the disc and casing, it being noted in Fig. 5 that the tube will be slightly flattened along its line of engagement with the disc. An advantage of this protrusion is that it tends to provide a relatively narrow and firm contact portion, but which has sufficient resiliency and flexibility so as to conform to irregularities in the disk periphery due to initial imperfections to wear or to warping of the valve structure, or to foreign matter adhering to the surfaces or becoming lodged between them. Pressure on the upstream side of the disc may cause slight depression of that portion of the tubular member exposed to the upstream pressure, while that portion of the tubular member exposed to the downstream pressure might be slightly bulged from its normal sealing shape. When the valve is to be opened, the pressure in the tube is first reduced to release it from contact with the disc, and the disc is then rotated to the open position.

When the valve is unsealed, such as would be the case just prior to opening or closing of the disc 4, pressure within the tube is dropped to a point whereby it may contract to its normal cylindrical condition, as shown in Fig. 7. To prevent collapsing of the tube by the high pressure within the pipe line, means are provided for maintaining pressure within the tube. This means is shown in Fig. 13 as attached to a modified form, but is equally applicable to the present form. The two ends of the tube have connection with a pipe 17 having a branch 18 extending to any suitable height, and carrying a suitable liquid reservoir 20 at its upper end, while a second branch 21 extends only part way up and is adapted to exhaust to atmosphere. Valves 22 and 23 control each of the two branches. The height of pipe 18 will determine the maximum sealing pressure, while the height of exhaust pipe 21 will determine the amount of pressure maintained within the tube to prevent collapse thereof. The reservoir may, when desired, be a closed vessel with provision for introducing compressed air above the liquid. Or, the tube may be inflated by compressed air instead of water.

In Fig. 8, the sealing means is shown as divided into two tubes 25 and 26, extending around each half of the casing periphery and terminating at their lower ends 27 and 28 adjacent the lower bearing 2, while the upper ends 29 and 30 extend outwardly from the groove 8 just short of the upper bearing 3. In this case, a tubular seal does not extend around the bearings, as in the other form, but an annular packing ring 31 may be disposed in suitable annular grooves 32 and 33, formed respectively in the casing and pivotal member. The outer corner of this packing ring may be suitably curved to conform to the curvature of the tube 11 as it bends outwardly; while in the case of the packing ring 34 disposed adjacent the lower bearing, its outer corner would conform to the surface of the sealed ends 27 and 28.

The operation of this modified form is identical to the other form, in that the tube ends 29 and 30 are connected to pipe 17 of the pressure control system.

Thus it is seen that I have provided an extremely simple and efficient means for sealing a valve, especially one of the pivot type. It has been found that valves of this type, constructed in accordance with my invention, can be made in immense diameters. Due to the use of a closed tube, the bore of which does not have access to the water in the pipeline, there is no danger of accumulations within the tube of silt, sand or the like preventing expansion and contraction of the tubular member. If water pressure is used, care is taken to insure a water supply free from harmful elements, such as sand or the like. If a suitable supply is not available, the water may be filtered. The flexible character of the tube will permit it to conform to any irregularities in the shape of the periphery of the pivot valve, which might be caused either by warping of the valve member or possibly by some undue strains placed upon the casing or other valve parts. The ability to conform to irregularities is aided by the pressure which is used to expand the tube. Moreover, by having the tubular member made of material such as rubber, the danger of cutting the tubular member by high-flow velocities is minimized. Further, the tubular member can be very economically replaced, both in the cost of the member itself and as to the labor of installing. This for the reason that such a construction does not involve any close fitting machine parts such as are ordinarily employed where there are relatively movable surfaces, for instance, snap rings or the like.

In my construction, the tubular member may be simply loosely disposed within its groove, or, when desirable, may be cemented or tightly held in the groove. Various manners of inserting this tube may be employed, one of which, for instance, may be of threading the tube within the groove 8 through the enlarged portion of said groove adjacent the point of overlap, such point being shown in Fig. 6. Thereafter, the tube ends could be passed upwardly through the openings 13 and 14 to the exterior.

In the form shown in Fig. 9, the tubes could be inserted within their respective grooves either by threading the same therein through the openings for the ends 29 and 30, or else by flattening the sides of the tube and inserting the same through the peripheral openings 9, after which, upon release of the tube, it would assume its normal position.

While the tubular members, so far described, are in cross-section, of circular form, they could be of any desired shape, the characteristic feature of a tubular member being that it is continuous or endless in cross-section, thereby to form a hollow interior. One modified form of tube is shown in Fig. 12, wherein the tubular member 35 has a substantially rectangular body portion disposed in a suitably shaped recess 36. Keeper rings 37 disposed in suitable recesses engage the edge portions of the tubular member, this having preferably flanges 38 which will be seated in suitable grooves in the keeper rings. The flexible portion of the tube is shown at 39, and when expanded by pressure in the hollow portion 40, will extend through the space between the two opposite keeper rings into engagement with the valve disc periphery. By such a formation, the flexible portion can be of substantial width. Thus the flexible portion will flex on a relatively large radius of curvature with the result that upon release of sealing pressure there is eliminated any tendency of the tube to remain in contact with the sealing surface.

Fig. 11 shows a modified arrangement of tubes, wherein each half of the valve casing has a plurality, preferably two, sections of tubes 42. The ends of each section are closed either by vulcanizing a rubber cap or end thereon, or by inserting a plug in the respective ends and clamping the tube around the plug, as by a suitable clamping strip encircling the tube. The adjacent ends of the sections are preferably flat, so that they will abut each other, especially when the tubes are expanded, thereby preventing formation of a space between the ends within which foreign material would otherwise accumulate. The ends of the sections adjacent the bearings may be flat or curved to suit the particular bearing, but, in any case, fluid pressure will be supplied or exhausted to and from the respective sections, as by pipes 43 leading therefrom outwardly through the casing and connected to a common pipe 44, which may be connected to any suitable source of pressure supply. The sections of tubes on each half of the valve casing will, of course, be connected to this common pipe. The exhaust of pressure may be controlled by suitable valves disposed in the pipes. If desired, the valves for controlling the pressure within the tubes may be interconnected with the operating mechanism for the prime mover, which is usually employed to move the pivot gate. The interlocking means is of any usual type between valves employed in a situation such as this, wherein, prior to the supply of power medium to the prime mover for opening the gate, pressure within the tubes will be released; whereas, prior to closure of the pivot valve, the pressure will likewise be released.

I claim:

1. The combination in a hydraulic valve mechanism interposed between up and downstream pipes at least one of which is filled with liquid under pressure throughout all normal operations of the valve, comprising a casing and a pivotal valve member adapted to be rotated into and out of juxtaposition to the inner wall of said casing, thereby to substantially prevent or to allow fluid flow through said valve, a tubular sealing member disposed between the adjacent surfaces of said casing and valve member when the valve is in closed position and said tubular member being adapted to have an unsealing position when the valve is closed, and means for expanding said tubular member by fluid pressure for effecting a sealing action and for releasing the sealing pressure to effect contraction of the tubular member and thereby allow the valve to open substantially freely.

2. The combination in a hydraulic pivot valve interposed between up and downstream pipes at least one of which is filled with liquid under pressure throughout all normal operations of the valve comprising, in combination, a casing and a pivotal valve element, and sealing means for said element and casing including a plurality of separate fluid pressure expansible rubber tubular members adapted for cooperation between adjacent circumferential portions of said casing and valve element, and means providing a fluid connection for each of said tubular members whereby sealing pressure may be admitted thereto to effect expansion thereof or may be released therefrom to effect contraction of the tubular members while the valve is in closed position.

3. The combination in a hydraulic valve mechanism interposed between up and downstream pipes at least one of which is filled with liquid under pressure throughout all normal operations of the valve, comprising a casing having a cylindrical inner periphery and a pivotal valve disc adapted to be rotated into and out of juxtaposition to said periphery thereby to substantially prevent or to allow fluid flow through said valve, said valve when in closed position and unsealed having a clearance space around said disc, and means for sealing said casing and disc by closing said clearance, comprising a rubber tubular member disposed between said peripheries and adapted to directly engage one or the other thereof during sealing, and means for supplying pressure fluid to said tubular member for effecting expansion thereof for sealing purposes and for releasing the sealing pressure to effect contraction of the tubular member and thus create said clearance whereby the valve may be sustantially freely movable to and from its closed position.

4. The combination in a valve mechanism adapted to be interposed between up and downstream pipes comprising a casing having a cylindrical inner periphery and a pivotal valve disc adapted to be rotated into and out of juxtaposition to said periphery, thereby to substantially prevent or to allow fluid flow through said valve which when in closed position and unsealed has a clearance space around said disc, and means for sealing said casing and disc by closing said clearance, comprising a tubular member disposed between said disc and said periphery and having an external fluid pressure inlet whereby it may be expanded for sealing purposes by fluid pressure.

5. The combination with a pivot valve having a casing element and a valve disc element adapted to cooperate therewith, one of said elements having a groove opening into the interior of said casing, of expansible tubular means insertable within said groove and adapted to be expanded through said groove opening by fluid pressure, thereby to effect a sealing action between said elements, said tubular means having a fluid connection extending outwardly to the exterior of said casing.

6. The combination with a pivot valve having a casing element and a valve disc element adapted to cooperate therewith, one of said elements having a groove opening into the interior of said casing, of expansible tubular means insertable within said groove and adapted to be expanded through said groove opening by fluid pressure, thereby to effect a sealing action between said elements, said tubular means having two fluid connections extending outwardly to the exterior of said casing.

7. The combination with a pivot valve comprising a casing and a valve disc, of sealing means for said disc and casing, comprising a pair of separate expansible tubular elements adapted for cooperation with opposite halves of said valve disc, and means for supporting said tubular elements which are adapted to be expanded by fluid pressure to effect the sealing action, each of said tubular elements having a fluid connection extending outwardly to the exterior of said casing.

8. The combination with a pivot valve comprising a casing and a valve disc, of sealing means for said disc and casing, comprising a pair of separate expansible tubular elements adapted for cooperation with opposite halves of said valve disc, and means for supporting said tubular elements which are adapted to be expanded by fluid pressure to effect the sealing action, each of said tubular elements having a fluid connection extending outwardly to the exterior of said casing, while the opposite ends of said tubular elements are closed.

9. The combination with a pivot valve comprising a casing member, a valve disc member and bearings for pivotally supporting the latter, of means for sealing said disc and casing members, including a pair of grooves formed in one of said members, and separate expansible tubular members disposed in said grooves, one end of said tubular members having a fluid connection extending outwardly, whereby fluid pressure may be introduced therein for expanding the same to effect the sealing action, while the other ends of said members are closed and terminate adjacent one of said bearings.

10. The combination with a pivot valve comprising a casing member, a valve disc member and bearings for pivotally supporting the latter, of means for sealing said disc and casing members, including a pair of grooves formed in one of said members, and separate expansible tubular members disposed in said grooves, one end of said tubular members extending outwardly adjacent opposite sides of one of said bearings, whereby fluid pressure may be introduced therein for expanding the same to effect the sealing action, while the other ends of said members are closed and terminate adjacent the other of said bearings.

11. In combination with a pivotal valve having a casing, a disc member and upper and lower bearings carried by the casing for pivotally supporting said disc, of means for sealing said disc and casing, comprising a groove formed in each of the opposite halves of the periphery of said casing and between said bearings, said grooves terminating adjacent the lower bearing, while the other ends of said grooves terminate in openings extending outwardly through said casing, the curvature of said grooves in a cross section being substantially cylindrical, while their inner sides terminate in a peripheral opening leading to the interior of said casing, and an expansible tubular member disposed in each of said grooves and having their ends adjacent the lower bearing closed, while their other ends adjacent the upper bearing extend through the openings adjacent thereto to permit pressure to be introduced into said tubular members to cause expansion thereof for sealing purposes.

12. In combination with a pivotal valve having a casing, a disc member, and upper and lower bearings carried by the casing for pivotally supporting said disc, of means for sealing said disc and casing, comprising a groove formed in the two halves of the periphery of said casing, said grooves terminating adjacent the lower bearing, while the other ends of said grooves terminate in openings extending outwardly through said casing, the curvature of said grooves in a cross-section are substantially cylindrical, while the inner sides of said grooves terminate in a peripheral opening leading to the interior of said casing, and an expansible tubular member disposed in each of said grooves and having their ends adjacent the lower bearing closed, while their other ends adjacent the upper bearing extend through the openings adjacent thereto to permit pressure to be introduced into said tubular members to cause expansion thereof for sealing purposes, said tubes when contracted, being snugly disposed within said grooves and having a cylindrical shape, and when expanded being adapted to extend through said peripheral opening to engage the disc periphery.

13. The combination in a valve mechanism adapted to be interposed between up and downstream pipes at least one of which would be normally filled with a fluid pressure throughout operations of the valve mechanism, said valve mechanism having a casing and a movable valve element, means for sealing said casing and valve element, comprising resilient-radially expansible tubular means, means for expanding said sealing means by fluid pressure and for releasing the sealing pressure to effect contraction of the sealing means while the valve is in closed position, and means for resisting inward movement thereof beyond a predetermined point.

14. The combination with a valve mechanism adapted to be interposed between up and downstream pipes at least one of which would be normally filled with fluid pressure throughout operations of the valve mechanism, said valve mechanism having a casing and a valve element therein movable, when near closed position, substantially parallel to the cooperating closing surface of said casing, of means for sealing said casing and valve element, comprising radially expansible flexible means, fluid pressure means for expanding said sealing means, and means for resisting inward movement thereof below a predetermined point, said latter means including a fluid pressure exhaust pipe adapted to maintain a predetermined pressure within said expansible means, to prevent collapse thereof by fluid pressure within the valve mechanism.

15. The combination in a valve mechanism adapted to be interposed between up and downstream pipes at least one of which would be normally filled with fluid pressure throughout operations of the valve mechanism, said valve mechanism comprising a casing, a movable valve element supported thereby, means for sealing said casing and element including a tubular member adapted to be expanded radially by fluid pressure to effect the seal and upon release of the pressure to contract to an unsealing position while the valve is closed, said tubular member having a surface with opposed portions whereby upon expansion for effecting the seal one portion of said surface is given a contour different from that contour which the tube has when contracted while the contour of the opposed surface portion remains substantially constant.

16. The combination in a hydraulic valve mechanism interposed between up and downstream pipes at least one of which is filled with liquid under pressure throughout all normal operations of the valve, comprising a casing and a pivotal valve member adapted to be rotated into and out of juxtaposition to the inner wall of said casing, thereby to substantially prevent or to allow fluid flow through said valve, a tubular sealing member disposed between the adjacent surfaces of said casing and valve member when the valve is in closed position and said tubular member being adapted to have an unsealing position when the valve is closed, and means for expanding said tubular member by fluid pressure for effecting a sealing action and for releasing the sealing pressure to effect contraction of the tubular member and thereby allow the valve to open substantially freely, the cross sectional configuration of said tubular sealing member having a relatively straight back side and a relatively small bulge on the opposite side which effects the sealing contact.

17. The combination in a hydraulic valve mechanism interposed between up and downstream pipes at least one of which is filled with liquid under pressure throughout all normal operations of the valve, comprising a casing and a pivotal valve member adapted to be rotated into and out of juxtaposition to the inner wall of said casing, thereby to substantially prevent or to allow fluid flow through said valve, a tubular sealing member disposed between the adjacent surfaces of said casing and valve member when the valve is in closed position and said tubular member being adapted to have an unsealing position when the valve is closed, and means for expanding said tubular member by fluid pressure for effecting a sealing action and for releasing the sealing pressure to effect contraction of the tubular member and thereby allow the valve to open substantially freely, said tubular sealing member having a configuration in the transverse section wherein the width is at least three times its depth.

18. The combination in a hydraulic valve mechanism interposed between up and downstream pipes at least one of which is filled with liquid under pressure throughout all normal operations of the valve, comprising a casing and a pivotal valve member adapted to be rotated into and out of juxtaposition to the inner wall of said casing, thereby to substantially prevent or to allow fluid flow through said valve, a tubular sealing member disposed betwen the adjacent surfaces of said casing and valve member when the valve is in closed position and said tubular member being adapted to have an unsealing position when the valve is closed, and means for expanding said tubular member by fluid pressure for effecting a sealing action and for releasing the sealing pressure to effect contraction of the tubular member and thereby allow the valve to open substantially freely, said tubular sealing member being relatively narrow and flat.

HOWARD M. SHEPPARD.